United States Patent
Sebire et al.

(10) Patent No.: US 10,284,354 B2
(45) Date of Patent: May 7, 2019

(54) METHODS, APPARATUS, COMPUTER PROGRAM, COMPUTER PROGRAM PRODUCT AND MOBILE COMMUNICATIONS NETWORK FOR SERVING CELLS COMPRISING PRIMARY CELL AND SECONDARY CELLS

(71) Applicant: Nokia Solutions and Networks Oy, Espoo (FI)

(72) Inventors: Benoist Pierre Sebire, Tokyo (JP); Guillaume Decarreau, Munich (DE); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 31 days.

(21) Appl. No.: 15/546,160

(22) PCT Filed: Jan. 30, 2015

(86) PCT No.: PCT/CN2015/071924
§ 371 (c)(1),
(2) Date: Jul. 25, 2017

(87) PCT Pub. No.: WO2016/119202
PCT Pub. Date: Aug. 4, 2016

(65) Prior Publication Data
US 2018/0343102 A1 Nov. 29, 2018

(51) Int. Cl.
*H04L 5/00* (2006.01)
(52) U.S. Cl.
CPC ............ *H04L 5/0098* (2013.01); *H04L 5/001* (2013.01); *H04L 5/0053* (2013.01); *H04L 5/0085* (2013.01); *Y02D 70/12* (2018.01)

(58) Field of Classification Search
CPC ..... H04L 5/001; H04L 5/0053; H04L 5/0085; H04L 5/0098; Y02D 70/12
See application file for complete search history.

(56) References Cited

U.S. PATENT DOCUMENTS

2014/0204811 A1    7/2014   Lu et al.
2015/0092707 A1*   4/2015   Kwon ................... H04W 76/38
                                                                    370/329
(Continued)

FOREIGN PATENT DOCUMENTS

CN    103636150 A    3/2014
EP    2928247 A1    10/2015
(Continued)

OTHER PUBLICATIONS

Office action received for corresponding Vietnam Patent Application No. 1-2017-02321, dated Sep. 11, 2017, 1 page of office action and 1 page of translation available.
(Continued)

*Primary Examiner* — Gary Mui
(74) *Attorney, Agent, or Firm* — Harrington & Smith

(57) ABSTRACT

There is provided alleviation to erroneous activation and de-activation of secondary cells carrying a physical uplink control channel. User equipment in a mobile communications network is defined serving cells comprising a primary cell and secondary cells. At least one physical uplink control channel is associated with a secondary cell. A secondary cell defined for transmission of the physical uplink control channel is de-activated. A secondary cell is activated, when at least one secondary cell defined for transmission of physical uplink control channel is active.

14 Claims, 2 Drawing Sheets

(56) References Cited

U.S. PATENT DOCUMENTS

| | | | | |
|---|---|---|---|---|
| 2015/0156764 | A1* | 6/2015 | Yang | H04L 1/0076 370/329 |
| 2015/0181461 | A1* | 6/2015 | Kim | H04W 74/08 370/236 |
| 2016/0044617 | A1* | 2/2016 | Vajapeyam | H04W 56/0005 370/336 |
| 2016/0050605 | A1* | 2/2016 | Kim | H04W 28/08 370/331 |
| 2016/0073360 | A1* | 3/2016 | Uchino | H04W 24/10 370/329 |
| 2016/0204905 | A1* | 7/2016 | Lee | H04L 1/1812 370/329 |
| 2016/0323851 | A1* | 11/2016 | Kim | H04L 5/001 |
| 2017/0170941 | A1* | 6/2017 | Yang | H04W 76/18 |
| 2017/0366306 | A1* | 12/2017 | Lee | H04L 5/001 |
| 2017/0374665 | A1* | 12/2017 | Lee | H04W 72/0413 |

FOREIGN PATENT DOCUMENTS

| | | |
|---|---|---|
| EP | 3253150 A1 | 12/2017 |
| WO | 2014/021664 A1 | 2/2014 |
| WO | 2014/054892 A1 | 4/2014 |
| WO | 2014/084111 A1 | 6/2014 |
| WO | 2016/114581 A1 | 7/2016 |

OTHER PUBLICATIONS

Extended European Search Report received for corresponding European Patent Application No. 15879410.7, dated Aug. 7, 2018, 12 pages.

"Introduce PUCCH on SCell for CA", 3GPP TSG RAN WG2 Meeting #87, R2-143217, Agenda Item: 7.1.1, Huawei, Aug. 18-22, 2014, pp. 1-6.

"Support of PUCCH on SCell for CA-RAN2 Aspects", 3GPP TSG-RAN WG2 #87, R2-143073, Agenda Item: 7.1.3.4, NTT Docomo Inc., Aug. 18-22, 2014, pp. 1-10.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300, V12.4.0, Dec. 2014, pp. 1-251.

"New WI proposal: LTE Carrier Aggregation Enhancement Beyond 5 Carriers", 3GPP TSG-RAN meeting #66, RP-142286, Agenda: 14.1.1, Nokia Corporation, Dec. 8-11, 2014, 9 Pages.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.4.0, Dec. 2014, pp. 1-60.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.4.1, Dec. 2014, pp. 1-410.

"36.300 CR for capturing B5C and PUCCH on SCell", 3GPP TSG-RAN meeting #70, RP-151957, Nokia Networks, Dec. 7-10, 2015, 6 Pages.

International Search Report and Written Opinion received for corresponding Patent Cooperation Treaty Application No. PCT/CN20151071924, dated Nov. 5, 2015, 11 pages.

* cited by examiner

METHODS, APPARATUS, COMPUTER PROGRAM, COMPUTER PROGRAM PRODUCT AND MOBILE COMMUNICATIONS NETWORK FOR SERVING CELLS COMPRISING PRIMARY CELL AND SECONDARY CELLS

RELATED APPLICATION

This application was originally filed as Patent Cooperation Treaty Application No. PCT/CN2015/071924 filed Jan. 30, 2015.

FIELD

The invention relates to serving cells comprising a primary cell and secondary cells and particularly to transmission of physical uplink control channel on secondary cells.

BACKGROUND

Release 10 of the 3rd Generation Partnership Project Evolved Universal Terrestrial Radio Access (E-UTRA) specifications introduces Carrier Aggregation (CA). In CA, two or more component carriers (CCs) are aggregated in order to support wider transmission bandwidths up to 100 MHz. A User Equipment capable of CA may simultaneously receive or transmit on one or multiple CCs depending on its capabilities.

In CA, the UE can be configured to aggregate a different number of CCs originating from the same evolved NodeB (eNB) and of possibly different bandwidths in the uplink (UL) and downlink (DL). The UE can be configured with a primary cell (PCell) that is used for security, Non Access Stratum (NAS) mobility and transmission of Physical Uplink Control Channel (PUCCH). Other configured CCs are called secondary cells (SCells) and do not have PUCCH configured.

The CA supports a possibility to de-activate CCs/SCells in order to reduce the UE power consumption. The UE monitoring activity of a de-activated SCell is reduced (e.g. no Physical Downlink Control Channel (PDCCH) monitoring nor Channel Quality Indicator (CQI) measurements are performed) and the Uplink (UL) activity, for example transmission of Sounding Reference Signals (SRSs), in a de-activated carrier is also stopped. However, the PCell, which carries PUCCH cannot be deactivated.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments alleviate erroneous de-activation of secondary cells carrying a physical uplink control channel.

BRIEF DESCRIPTION OF THE DRAWINGS

In the following embodiments will be described in greater detail by means of preferred embodiments with reference to the accompanying drawings, in which.

DETAILED DESCRIPTION

Figure 1:
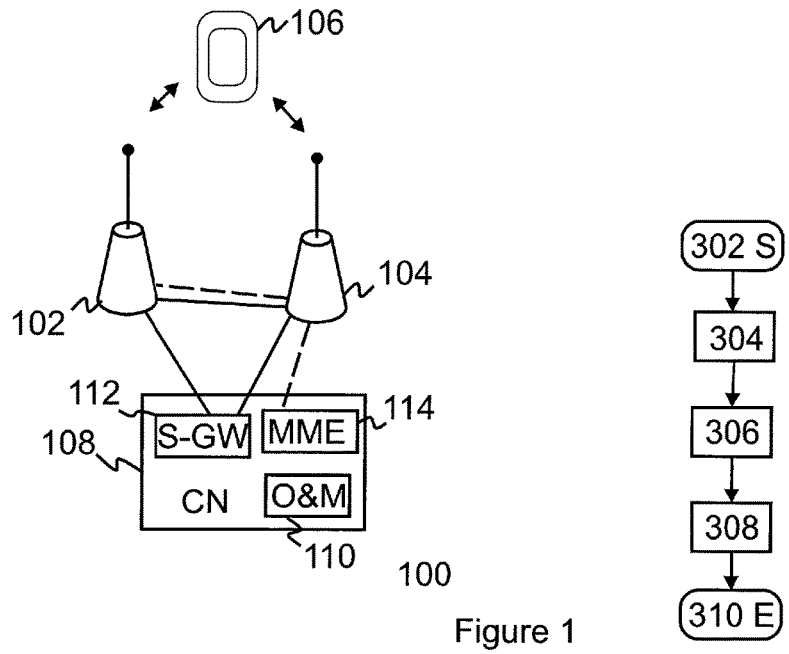
FIG. 1 presents an example of a mobile communications network according to an embodiment.

FIG. 1 presents an example of a mobile communications network 100 according to an embodiment. The mobile communications network may comprise a radio access network formed by one or more radio access nodes 102, 104. The radio access nodes, for example eNBs or base stations, may be capable of providing access to the network for UE 106. The UE may be connected to the eNBs 102, 104 over wireless radio channels. The eNBs may have coverage areas, where wireless communications between the UE and the eNBs is possible. The coverage areas may be defined by a range of the wireless radio communications.

The mobile communications network may support a Dual Connectivity (DC) operation mode of the UE. In the DC operation mode, the UE is configured with resources from two eNBs. In the DC operation mode one of the eNBs may be a MeNB 104 and the other may be a SeNB 102. The UE may be allocated resources from both of the MeNB and the SeNB.

Each eNB may have one or more cells, for example ranging from 1 to 50 cells or more, that have resources for communications with the UE. The cells may have separate or overlapping or partly overlapping coverage areas. Each cell may be identified by a cell identifier for identifying the cell to the UE.

A resource may be a transmission unit on a wireless radio channel between the UE and an eNB. The transmission unit may be a unit for uplink transmission or downlink transmission of data. An uplink transmission refers to a direction of the transmission from the UE to the eNB, and the downlink transmission refers to a direction of the transmission from the eNB to the UE. The data may comprise user data and/or control signaling.

A cell may have a carrier frequency for communications between UE and eNB. Data may be communicated on a communications bandwidth in the carrier frequency of the cell. The data may comprise symbols modulated according to a digital multi-carrier modulation method, for example Orthogonal Frequency Division Multiplexing (OFDM). The cell may provide uplink and/or downlink communications. Uplink and downlink communications may be provided on respective carriers that may be defined by carrier frequencies and/or time slots. When separate carrier frequencies are used for the uplink and downlink communications, the communications may be referred to as Frequency Division Duplex (FDD) communications. When the same carrier frequency is used for the uplink and downlink communications and the uplink and downlink communications are separated in time, the communications may be referred to as Time Division Duplex (TDD) communications.

In the DC operation mode, both the MeNB and the SeNB may have PCell and SCells which are configured with PUCCH. Cells configured to the UE in the MeNB are referred to as a Master Cell Group (MCG). Cells configured to the UE in the SeNB are referred to as a Secondary Cell Group (SCG).

A PCell may serve for transmitting system information to UE, controlling handovers and Radio Resource Control (RRC) connection configuration. Accordingly, the UE may have an RRC connection with the network via the PCell. At RRC connection establishment/re-establishment/handover, one serving cell may provide the NAS mobility information (e.g. a tracking area identifier), and at RRC connection re-establishment/handover, one serving cell may provide the security input. In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells for the UE. In the downlink, the carrier corresponding to a SCell may be a Downlink Secondary Component Carrier (DL SCC). In the uplink, the carrier corresponding to the SCell may be an Uplink Secondary Component Carrier (UL SCC). A SCell may or may not have an uplink carrier.

Carrier Aggregation (CA) may be used in communications in the mobile communications network. In CA, two or more carriers are aggregated in order to support wider transmission bandwidths. The aggregated carriers may be referred to as Component Carriers (CCs).

A Core Network (CN) 108 may be connected to the eNBs. The CN may comprise a control entity 114, a gateway entity 112 for routing user traffic and an Operation and Management system (O&M-system) 110. The control entity may act as a termination point in the CN for a control plane connection of the UE in the CN. The gateway entity may act as a termination point for a user plane connection of the UE in the CN. The O&M-system provides management of the entities of the communications network. The O&M-system may include a database storing a configuration of the network. The configuration of the network may include a frequency plan of the cells and identifiers of the cells. In E-UTRAN a cell may be identified by a Cell Global Identifier (ECGI) and/or by a Physical Cell Identifier (PCI). The ECGI is unique for a specific network but the PCI may be repeated inside the network.

A control plane connection of the UE to the CN may be provided in the radio access network by the MeNB that terminates the control plane connection of the UE. A user plane connection of the UE may be provided via the MeNB, via the SeNB or via both the MeNB and the SeNB. The MeNB and the SeNB may be connected for transfer of user data over the user plane connection and control data over a control plane connection. In FIG. 1, control plane connections are illustrated by dashed lines and user plane connections are illustrated by solid lines for the UE in a DC operation mode.

Examples of the control entity in the CN may comprise a Mobility Management Entity (MME), Radio Network Controller (RNC) and a Switching Entity (SE). Examples of the gateway entity in the CN may comprise a Serving Gateway (SGW), a Gateway (GW), Serving GPRS Support Node (SGSN) and a Media Gateway (MGW).

In one example, the 3GPP Release 12 Specifications may be used to implement the mobile communications network illustrated in FIG. 1. An overall description of the E-UTRA may be referred to in 3GPP TS 36.300 V12.4.0 (2014-12), which may be referred to for purposes of implementing the mobile communications network and/or an entity such as UE and eNBs, and/or a function performed by the entity.

For example, the connections between the CN and the eNBs may be implemented as S1 connections and the connections between the eNBs may be implemented as X2 connections. Although the present description uses the terminology of the 3GPP Release 12 Specifications, it should be appreciated that embodiments may be implemented in other mobile communications networks and entities.

A control plane connection of the UE may be implemented using Radio Resource Protocol (RRC) that is a layer 3 protocol. A user plane connection of the UE may be implemented using Packet Data Convergence Protocol (PDCP). The downlink and uplink communications may comprise physical channels carrying user data and control signaling.

Communications in downlink may be based on multi-carrier OFDM. Different radio frame structures may be supported for FDD (frequency division duplex) and TDD (time division duplex) duplex mechanisms. Downlink and uplink transmissions may be organized into radio frames 201. In one example, radio frame duration may be 10 msec. Other frame durations, for example, in the range of 1 to 100 msec may also be supported. A radio frame may be divided into sub-frames. Sub-frame duration may be 0.5 msec, 1 msec, 2 msec, or 5 msec, for example. Sub-frame(s) may consist of two or more slots 206. For the example of FDD, 10 sub-frames may be available for downlink transmission and 10 sub-frames may be available for uplink transmissions in each 10 msec interval. Uplink and downlink transmissions may be separated in the frequency domain. Slot(s) may include a plurality of OFDM symbols. The number of OFDM symbols in a slot may depend on the cyclic prefix length and subcarrier spacing. In Carrier Aggregation (CA), two or more Component Carriers (CCs) are aggregated in order to support wider transmission bandwidths up to 100 MHz. A UE may simultaneously receive or transmit on one or multiple CCs depending on its capabilities. CCs in an aggregated carrier may be from different frequency bands, referred to as inter-band CA, from the same band, referred to as intra-band CA. In intra-band CA, the CCs may be adjacent to each other, referred to as intra-band contiguous CA, or the CCs may be nonadjacent, referred to as intra-band non-contiguous CA. The spacing between center frequencies of the contiguously allocated CCs is a multiple of 300 kHz for preserving orthogonally of the subcarriers with 15 kHz spacing. The downlink and uplink may be configured independently. However, the number of uplink carriers may not exceed the number of downlink carriers.

A UE with single timing advance capability for CA can simultaneously receive and/or transmit on multiple CCs corresponding to multiple serving cells sharing the same timing advance. Serving cells sharing the same timing advance may belong to the same Timing Advance Group (TAG). On the other hand a UE with multiple timing advance capability for CA can simultaneously receive and/or transmit on multiple CCs corresponding to multiple serving cells with different timing advances. Accordingly, the serving cells may be have different timing advances and belong to different TAGs. E-UTRAN ensures that each TAG contains at least one serving cell.

Figure 2:
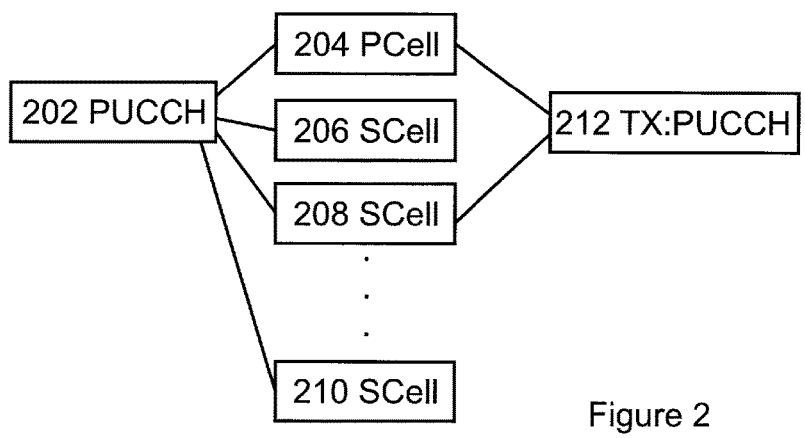
FIG. 2 presents an example of associating a physical uplink control channel to serving cells.

FIG. 2 presents an example of associating a physical uplink control channel 202 to serving cells 204, 206, 208, 210. The serving cells may be serving cells configured to UE in a mobile communications network, for example the mobile communications network of FIG. 1. At least part 212 of the serving cells 204, 208 are configured to carry PUCCH 202. The serving cells carrying the PUCCH may comprise one or more SCells 208 and a PCell 204. The serving cells may be grouped in one or more PUCCH groups (PUGs). SCells that belong to a PUG are associated to a PUCCH. Accordingly, for each SCell, there is an associated cell with a PUCCH configured. For each cell, SCell or PCell, carrying a PUCCH, the group of cells that are using this PUCCH is called a PUG. A Primary PUG (PPUG) containing a PCell, and a secondary PUG (SPUG) containing a SCell with a PUCCH configured. A SCell carrying the PUCCH may be referred to as SCell_PUCCH_TX. At least part of the serving cells is not configured to carry the PUCCH.

In an embodiment, a SCell not configured to carry a PUCCH, referred to as SCell_w/o_PUCCH, may be configured to transmit the PUCCH on one or multiple of the cells that carry PUCCH, e.g. on PCell, on SCell_PUCCH_Tx, or on both, which means the SCell is configured to one or more than one PUG, e.g. to PPUG, SPUG or on both PPUG and SPUG.

Figure 3:
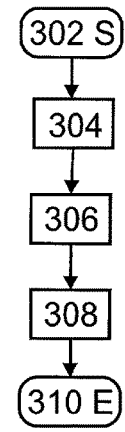
FIG. 3 presents an example of a method according to an embodiment.

FIG. 3 presents an example of a method according to an embodiment. The method may be performed by an UE in a mobile communications network, for example presented in FIG. 1. The method may start 302, when the UE is within a coverage area of at least one eNB and one or more cells of the eNB.

Serving cells may be defined 304 to the UE in a mobile communications network. The serving cells may comprise a primary cell and one or more secondary cells. The serving cells may be defined by dedicated RRC signaling from the eNB.

In an embodiment, at least one of the serving cells comprise a serving cell defined for transmission of the physical uplink control channel, SCell_PUCCH_TX, and a serving cell not defined for transmission of the physical uplink control channel, SCell_w/o_PUCCH.

At least one Physical Uplink Control Channel (PUCCH) may be associated 306 with at least one of the secondary cells. The PUCCH may be associated to secondary cells, i.e. SCell_w/o_PUCCHs, that are not configured to carry the PUCCH and/or to secondary cells, i.e. SCell_PUCCH_TXs, that are configured to carry the PUCCH.

In one example of associating the PUCCH to a SCell, the PUCCH may be needed for transmission of a Hybrid Automatic Repeat-ReQuest (ARQ) Acknowledgements/Non-acknowledgements (ACK/NAKs) in response to downlink transmission and/or Channel State Information (CSI) reports for the SCell. If the SCell is not configured with carrying PUCCH, ACK/NACK and/or CSI for the SCell may be sent on the SCell that is configured to carry the PUCCH.

In one example associating the PUCCH to a SCell, the PUCCH may be needed for transmission of a Scheduling Request (SR), whereby the PUCCH may be associated to the SCell on which the SR is transmitted.

Serving cells of the UE may be de-activated and/or activated 308. When a SCell is deactivated, the UE does not need to receive the corresponding PDCCH or POSCH (Physical Downlink Shared CHannel), cannot transmit in the corresponding uplink, nor is it required to perform CQI measurements. When a SCell is active, the UE shall receive POSCH and PDCCH (if the UE is configured to monitor PDCCH from this SCell), and is expected to be able to perform CQI measurements.

In one example a SCell may be deactivated when receiving deactivation command from eNB via MAC Control element or when deactivation timer for the SCell expires.

In an embodiment, one or more SCells defined for transmission of the PUCCH, SCell_PUCCH_TXs, may be de-activated 308.

In an embodiment, a SCell that does not carry PUCCH, SCell_w/o_PUCCH, may be de-activated 308, when all, one or more, SCells defined for transmission of the PUCCH, SCell_PUCCH_TXs, are de-activated. The de-activation may be performed via Medium Access Control Control Element (MAC CE) or when deactivation timer for the SCell_PUCCH_TX expires, which are described for example in Section 11.2 of the 3GPP E-UTRA specification TS 36.300.

In an embodiment, if a SCell is only configured to an SPUG, the SCell should be deactivated when the SCell configured to transmit the PUCCH is deactivated; deactivation timer for the SCell should be expired when the de-activation timer for the SCell configured to transmit the PUCCH is expired. In another embodiment, if a SCell is configured to multiple PUG, the SCell should be deactivated when all the cells configured to transmit the PUCCH are deactivated; deactivation timer for the SCell should be expired when the deactivation timer for all the cells configured to transmit the PUCCH is expired.

In an embodiment, a serving cell, may be activated 308, when at least one cell, SCell_PUCCH_TXs or PCell, defined for transmission of the PUCCH is active. Accordingly, not all SCell_PUCCH_TXs may be de-activated for activating the SCell_w/o_PUCCH. Accordingly, activation of the SCell_w/o_PUCCH can only be done when it has some cell to send the PUCCH. On the other hand, the SCell_w/o_PUCCH can also be maintained as de-activated.

The SCell that does not carry PUCCH may be a part of one or more than one PUG, whereby the SCell_w/o_PUCCH may be activated, when at least one cell, SCell_PUCCH_TX or PCell, defined for transmission of the PUCCH is active.

In an embodiment, activation 308 of SCell_w/o_PUCCH may be controlled by a method comprising, determining states of the SCell_PUCCH_TX, and deactivating the SCell_w/o_PUCCH, when all the states of the secondary cells defined for transmission of the physical uplink control channel are de-activated. The states of the SCells may comprise an active state or a de-active state. Accordingly, at least one of the SCell_PUCCH_TXs or PCell that carries the PUCCH should be active for activating a SCell_w/o_PUCCH.

The method may end 310 after the SCell_w/o_PUCCH has been 35 de-activated or activated or the SCell_w/o_PUCCH has been maintained as active or de-activated.

Figure 4:
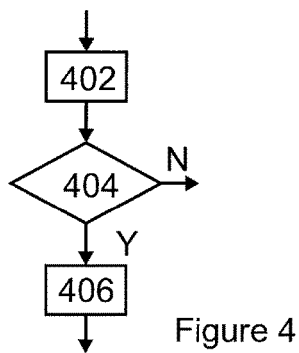
FIG. 4 presents an example of a method for controlling de-activation of secondary cells according to an embodiment.

FIG. 4 presents an example of a method for controlling de-activation of secondary cells according to an embodiment. The controlling may be performed as a part of the method of FIG. 3, for example step 308.

Now referring to the embodiment in FIG. 4, states of the secondary cells, SCell_PUCCH_TXs, defined for transmission of the PUCCH may be determined 402. The states of the secondary cells may comprise an active state or a de-active state. The states may be used in determining 404, whether to de-activate 'Y' 406 a secondary cell associated with the PUCCH, SCell_w/o_PUCCH, or not 'N' to de-activate the secondary cell. If 'Y' all the secondary cells, SCell_PUCCH_TXs, are in a de-activated state, the method may proceed to de-activate the secondary cell, SCell_w/o_PUCCH, associated with the PUCCH. The de-activation may be performed as described in step 308 of FIG. 3. If 'N' not all the secondary cells, SCell_PUCCH_TX, are de-activated, the current state, e.g. active, of the secondary cell may be maintained after which the method may end as described in 310.

In an embodiment, a secondary cell, SCell_w/o_PUCCH, may be a part of at least two groups, PUGs, of secondary cells associated with different PUCCHs. A group of secondary cells associated to a PUCCH may comprise the SCell_w/o_PUCCH and at least one or more SCell_PUCCH_TXs. If 'Y' all the secondary cells, SCell_PUCCH_TXs, in the at least two groups of secondary cells are in a de-activated state and associated with the same PUCCH as the SCell_w/o_PUCCH, the SCell_w/o_PUCCH may be de-activated 406. However, if not all the SCell_PUCCH_TXs associated with the same PUCCH as SCell_w/o_PUCCH are de-activated, the current state, e.g. active, of the secondary cell may be maintained after which the method may end as described in 310.

Figure 5:
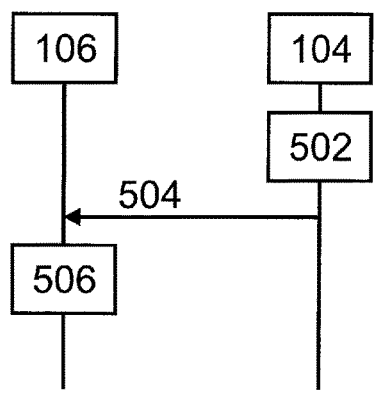
FIG. 5 presents an example of communications between entities of a mobile communications network according to an embodiment.

FIG. 5 presents an example of communications between entities of a mobile communications network according to an embodiment. The entities may be the eNBs and the UE described in the mobile communications network of FIG. 1. The communications is now described with reference to the items in FIG. 5. The eNB 104 may generate 502 a message including information indicating one or more secondary cells to be de-activated and/or activated. In one example the message may comprise a bitmap including bits corresponding to secondary cells, whereby a bit value '1' may indicate that a secondary cell corresponding to the bit value should be activated, and a bit value '0' may indicate that a secondary cell corresponding to the bit value should be de-activated. The secondary cells may be associated with a PUCCH for example as described in FIG. 2. A message applicable to E-UTRA is described in Section 11.2 in the TS 36.300 describes an example of a message, a MAC Control Element, suitable for implementing the message.

The generated message 504 may be sent to the UE. The message may be sent on a downlink channel, for example a Downlink Shared Channel or a Downlink Dedicated Channel.

The UE may obtain the message 504 and de-activate 506 the secondary cell, when all secondary cells defined for transmission of physical uplink control channel are de-activated. On the other hand the secondary cell may be activated, when at least one secondary cell defined for transmission of physical uplink control channel is active. The secondary cell may be maintained active, when not all the secondary cells defined for transmission of physical uplink control channel are de-activated. Accordingly, there is at least one active secondary cell defined for transmission of physical uplink control channel. On the other hand the secondary cell may be maintained de-activated, when at least one of the secondary cells defined for transmission of physical uplink control channel is active.

The activation and de-activation may be performed as described in connection with the methods of FIG. 3 or 4. The activation and de-activation may be performed by a bitwise logical operations applied on the bitmap and the states of the secondary cells of the UE.

Figure 6:
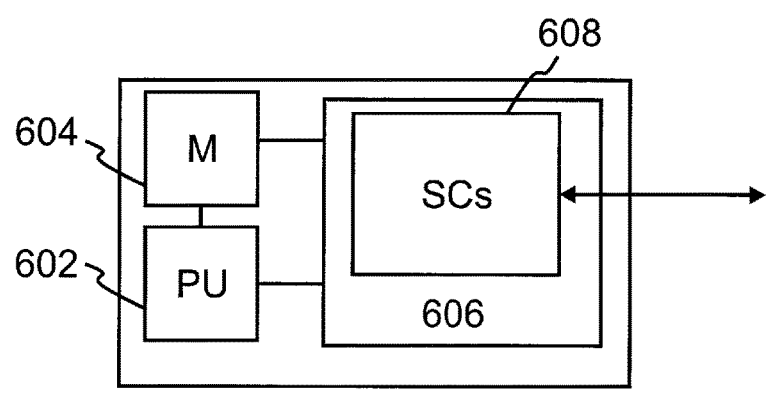
FIG. 6 illustrates an example of an apparatus according to an embodiment.

FIG. 6 illustrates an example of an apparatus according to an embodiment. The apparatus comprises at least one Processing Unit (PU) 602 and at least one memory 604. The Memory (M) may store instructions to be executed by the processor. The instructions may comprise a computer program for executing a computer process, for example. The PU, and the M may be electrically connected to cause execution of a method according to an embodiment. The apparatus may be a UE or any other terminal device, for example a mobile phone or a smart phone, capable of cellular communications in a mobile communications network.

According to an embodiment, an apparatus such as eNB or UE, or a part of the apparatus, may comprise processing means configured to carry out any of the embodiments of FIGS. 3, 4 and 5. The processing means may be formed by the at least one processor 602 and the memory 604.

In an embodiment an apparatus may comprise an interfacing unit 606 for communications of data and/or messages in a mobile communications network. The mobile communications network may be the mobile communications network of FIG. 1. The interface unit may be capable of communications in one or more cells. The cells may be serving cells 608 comprising a PCell and possibly one or more SCells. The serving cells may include SCell_w/o_PUCCH and SCell_PUCCH_TXs, that may be activated and de-activated as described in an embodiment. In DC operation mode, the serving cells may comprise an MCG and an SCG.

In an embodiment there is provided a computer program comprising computer program code for execution on a computer to cause a method according to an embodiment, when said product is run on a computer. The computer program may be embodied on a computer-readable storage medium.

In an embodiment there is provided a computer program product for a computer, comprising a computer program according to an embodiment.

An embodiment concerns a computer program embodied on a computer-readable storage medium, the computer program comprising program to execute a process comprising a method according an embodiment.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer-readable storage medium. The computer-readable storage medium may be a computer program distribution medium readable by a computer or a processor. The computer-readable storage medium may be, for example but not limited to, a record medium, computer memory, read-only memory, electrical carrier signal, telecommunications signal, and software distribution package, for example.

The techniques described herein may be implemented by various means so that an apparatus implementing one or more functions of an interfacing unit, eNB or UE described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. A hardware implementation may be through one or more circuits, for example Application Specific Circuits (ASICs). For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

What is claimed is:

1. A method comprising:
    defining serving cells to a user equipment in a mobile communications network, said serving cells comprising a primary cell and secondary cells;
    associating at least one physical uplink control channel with a first one of the secondary cells, wherein the first secondary cell is a part of at least one of at least two groups of secondary cells associated with different physical uplink control channels, where the first secondary cell is de-activated when all of the secondary cells defined for transmission of the physical uplink control channel in the at least two groups are de-activated; and at least one of:
        de-activating a second one of the secondary cells, defined for transmission of the physical uplink control channel; and
        activating the first secondary cell when at least one of the serving cells defined for transmission of the physical uplink control channel is active.

2. The method according to claim 1, whereby wherein the first secondary cell is activated when at least one of the secondary cells defined for transmission of the physical uplink control channel in one of the at least two groups is active.

3. The method according to claim 1, wherein a message is generated, said message including information indicating the first or second secondary cell to be de-activated, wherein the message is sent to the user equipment.

4. The method according to claim 1, further comprising maintaining the first secondary cell active, when at least one of the secondary cells defined for transmission of the physical uplink control channel in one of the at least two groups is active.

5. The method according to claim 1, wherein the secondary cells comprise component carriers of an aggregated carrier.

6. The method according to claim 1, wherein the serving cells comprise a serving cell defined for transmission of the physical uplink control channel and a serving cell not defined for transmission of the physical uplink control channel.

7. An apparatus, comprising:
    at least one processor, and
    at least one non-transitory memory for storing instructions to be executed by the processor, wherein the at least one non-transitory memory and the instructions are configured to, with the at least one processor, cause the apparatus at least to:
        define serving cells to a user equipment in a mobile communications network, said serving cells comprising a primary cell and secondary cells;
        associate at least one physical uplink control channel with a first one of the secondary cells, wherein the first secondary cell is a part of at least one of at least two groups of secondary cells associated with different physical uplink control channels, where the first secondary cell is de-activated when all of the secondary cells defined for transmission of the physical uplink control channel in the at least two groups are de-activated; and at least one of:
            de-activate a second one of the secondary cells, defined for transmission of the physical uplink control channel; and
            activate the first secondary cell when at least one of the serving cells defined for transmission of the physical uplink control channel is active.

8. The apparatus according to claim 7, wherein the first secondary cell is activated when at least one secondary cell defined for transmission of the physical uplink control channel in one of the at least two groups is active.

9. The apparatus according to claim 7, wherein the at least one non-transitory memory and the instructions are further configured to, with the at least one processor, cause the apparatus at least to:
    generate a message, said message including information indicating the first or second secondary cell to be de-activated, wherein the message is sent to the user equipment.

10. The apparatus according to claim 7, wherein the at least one non-transitory memory and the instructions are configured to, with the at least one processor, cause the apparatus at least to:
    maintain the first secondary cell active, when at least one of the secondary cells defined for transmission of the physical uplink control channel is active.

11. The apparatus according to claim 7, wherein the secondary cells comprise component carriers of an aggregated carrier.

12. The apparatus according to claim 7, wherein the serving cells comprise a serving cell defined for transmission of the physical uplink control channel and a serving cell not defined for transmission of the physical uplink control channel.

13. The apparatus according to claim 7, wherein the apparatus is the user equipment.

14. A non-transitory computer program product, comprising computer program code that when executed by a processor, perform a method comprising:
    defining serving cells to a user equipment in a mobile communications network, said serving cells comprising a primary cell and secondary cells;
    associating at least one physical uplink control channel with a first one of the secondary cells, wherein the first secondary cell is a part of at least one of at least two groups of secondary cells associated with different physical uplink control channels, where the first secondary cell is de-activated when all of the secondary cells defined for transmission of the physical uplink control channel in the at least two groups are de-activated; and at least one of:
        de-activating a one of the second secondary cells, defined for transmission of the physical uplink control channel; and
        activating the first secondary cell when at least one of the serving cells defined for transmission of the physical uplink control channel is active.

* * * * *

UNITED STATES PATENT AND TRADEMARK OFFICE
CERTIFICATE OF CORRECTION

PATENT NO. : 10,284,354 B2
APPLICATION NO. : 15/546160
DATED : May 7, 2019
INVENTOR(S) : Benoist Pierre Sebire et al.

Page 1 of 1

It is certified that error appears in the above-identified patent and that said Letters Patent is hereby corrected as shown below:

In the Claims

In Claim 2:
Column 9, Line 28, "whereby" should be deleted.

Signed and Sealed this
Second Day of July, 2019

Andrei Iancu
*Director of the United States Patent and Trademark Office*